United States Patent [19]
Halasa et al.

[11] 4,052,545
[45] * Oct. 4, 1977

[54] PROCESS FOR POLYMERIZING CONJUGATED DIENES

[75] Inventors: Adel Farhan Halasa, Bath; Richard Gutierrez, Akron, both of Ohio

[73] Assignee: The Firestone Tire & Rubber Company, Akron, Ohio

[*] Notice: The portion of the term of this patent subsequent to Apr. 6, 1993, has been disclaimed.

[21] Appl. No.: 657,123

[22] Filed: Feb. 11, 1976

Related U.S. Application Data

[63] Continuation-in-part of Ser. No. 458,951, April 8, 1974, Pat. No. 3,948,869.

[51] Int. Cl.$^2$ .................. C08F 4/64; C08F 236/04; C08F 236/06; C08F 236/08
[52] U.S. Cl. .................................. 526/140; 526/339
[58] Field of Search ........................... 526/140, 339

[56] References Cited

U.S. PATENT DOCUMENTS

| | | | |
|---|---|---|---|
| 3,317,494 | 5/1967 | Farson | 526/140 |
| 3,470,144 | 9/1969 | Minekawa et al. | 526/339 |
| 3,590,024 | 6/1971 | Ishizuka et al. | 526/339 |
| 3,766,153 | 10/1973 | Kawasaki et al. | 526/339 |
| 3,803,106 | 4/1974 | Hayashi et al. | 526/339 |
| 3,914,207 | 10/1975 | Kang | 526/140 |
| 3,948,869 | 4/1976 | Halasa et al. | 526/140 |

Primary Examiner—Alan Holler

[57] ABSTRACT

Conjugated dienes and alpha-olefins, such as butadiene and propylene, are copolymerized by a new catalyst system which gives copolymers containing a high proportion of the alpha-olefin with accompanying desired properties. This catalyst system comprises: (1) A titanium or vanadium halide, preferably chloride, (2) an aluminum hydrocarbon compound which also has Cl, Br or H attached to the Al atom and preferably the hydrocarbon group or groups are alkyl groups which have 1–8 carbon atoms in each of said alkyl groups and (3) $CS_2$. The copolymers produced by this process have molecular weights in the range of 100,000–5,000,000; referably 250,000–500,000, and other desirable properties.

19 Claims, No Drawings

PROCESS FOR POLYMERIZING CONJUGATED DIENES

This application is a continuation-in-part of co-pending application Ser. No. 458,951, filed Apr. 8, 1974, now U.S. Pat. No. 3,948,869.

BACKGROUND OF THE INVENTION

1. Field of the Invention

This invention relates to a process for the copolymerization of a diene, such as butadiene, with an alpha-olefin, such as propylene, using a catalyst comprising a titanium or vanadium halide, a hydrocarbon aluminum chloride, bromide or hydride and carbon disulfide to give copolymers having a substantial proportion of propylene or other alpha-olefin therein.

2. Related Prior Art

The copolymerization of propylene with conjugated dienes has been reported in several instances. However, the methods reports for effecting such copolymerization have various disadvantages.

For example, British Pat. No. 1,108,630 shows the use of a catalyst system comprising $TiCl_4$, aluminumtrialkyl and iodine.

French Pat. No. 2,047,646 shows the use of a catalyst system comprising $TiX_4$ wherein X is Cl, Br or I, $AlR_3$ wherein R is alkyl, aryl or cycloalkyl, and a compound containing a carbonyl group. Preferred carbonyl compounds as illustrated in the examples are benzophenone, diisobutyl aldehyde, benzoyl chloride, isobutyric acid, benzoic acid, monochloroacetic acid, maleic anhydride, diethyl malonate, diethyl acetate, acetone, benzaldehyde, acetic anhydride, etc. Temperatures of $-30°$ to $-40°$ C are apparently preferred since all of the 34 working examples are conducted at these temperatures with the exception of one at $-15°$ C and one at $-55°$ C.

The low temperature polymerization in these prior art systems are impractical for industrial purposes because of the added expense and slow polymerization rates.

SUMMARY OF THE INVENTION

In accordance with the present invention, it has now been found that more practical temperatures may be used in the preparation of copolymers of a conjugated diene with an alpha-olefin having 2-8 carbon atoms, with high proportions of the alpha-olefin therein to give desirable properties and with desired molecular weights, conversions and microstructure by the use of a catalyst system comprising (1) a halide having the formula $TiBr_nCl_{4-n}$ or $VBr_mCl_{5-m}$ wherein $n$ is an integer having a value of 0–4 and $m$ is an integer having a value of 0–5; (2) an aluminum hydrocarbon compound having the formula $R_2AlX$ or $RAlX_2$ wherein X is Cl, Br or H, and R is aryl, cycloalkyl or preferably alkyl, with R having 1–8 carbon atoms; and (3) carbon disulfide. In this catalyst system the ratio of Al to Ti or V is advantageously 0.9–3 moles, preferably 0.9–1.15 moles, of Al compound per mole of Ti or V; the ratio of $CS_2$ to Ti or V compound is 0.01–0.5, preferably 0.01–0.1 mole of $CS_2$ per mole of Ti or V compound; and the ratio of Ti or V compound to monomer is 1–10 millimoles of Ti or V compound per 100 grams of monomer. Advantageously the compolymerization is effected in a hydrocarbon solution which contains 10–90%, preferably 10–50% by weight of the monomers.

In the parent application, Ser. No. 458,951, the use of aluminum trihydrocarbon compounds as the aluminum catalyst component is disclosed as well as the present aluminum compounds. It has been found that hydrocarbon aluminum chlorides, bromides and hydrides, when used as the catalyst component is this invention under equivalent conditions, give a faster copolymerization rate, a higher proportion of alpha-olefin in the resultant copolymer and higher molecular weight copolymers than do the trihydrocarbon aluminum compounds.

The presence of the $CS_2$ permits the addition of as much propylene or other alpha-olefin as desired, that is 5–90% olefin, with 5–60% by weight based on the combined weight of olefin and diene being preferred. It also promotes high conversions and desirable molecular weights and the resultant copolymers are predominantly of the preferred cis-1,4 microstructure. The use of $CS_2$ also has the advantage of permitting control over the stereoregularity and thereby the crystallinity of the resultant copolymer. Thus by control of the amount of $CS_2$ used, it is possible to control the type of copolymer. For example, with lower ratios of $CS_2$ within the range indicated above, the more alternating is the resultant copolymer structure, such as a repeating unit of diene, then one of olefin, then one of diene, then one of olefin, etc. With higher ratios of $CS_2$ within the indicated range, there is more block copolymer formed with the diene polymerizing first and then the olefin. In the intermediate area of this range there may be considerable random copolymer formed.

If desired, a portion of the $CS_2$, that is up to 50 mole percent, may be replaced by thiocarbonyl or thiocarbamyl or carbonyls such as thioacetophenone, benzothiophenone, acetylthioacetone, thioamides and dithiocarbamates, acetophenone, benzophenone, acetyl acetone, etc., without sacrificing the advantageous effects of the $CS_2$.

The titanium or vanadium halides that may be used as one of the catalyst components include $TiCl_4$, $VCl_5$, $TiBr_4$, $VBr_5$, $TiBrCl_3$, $TiBr_2Cl_2$, $TiBr_3Cl$, $VBrCl_4$, $VBr_2Cl_3$, $VBr_3Cl_2$, and $VBr_4Cl$, and mixtures thereof. Preferably $TiCl_4$ or $VCl_5$ is used.

The catalyst is used in a proportion of 1 to 10 millimoles per 100 grams of monomer. In referring to millimoles of catalyst, this corresponds to the millimoles of the titanium or vanadium compound since the catalyst is regarded or at least calculated as a complex of the titanium or vanadium compound with the other catalyst components.

Copolymerization is advantageously conducted at a temperature of $-10°$ to $70°$ C ($14°$–$158°$ F), preferably $0°$ to $50°$ C ($32°$–$122°$ F). At these temperatures polymers are produced with yields as high as 98–99% and molecular weights generally no higher than 500,000, advantageously in the range of about 100,000 to 500,000, which correspond to dilute solution viscosities of 0.5 to 3, preferably 250,000–500,000 (DSV of 1.5 to 3). Also at these temperatures, the copolymerization rate is quite fast and very practical use is made of this catalyst. This is in contrast to prior art processes which teach temperatures of $-"$ to $0°$ C to obtain practical molecular weights and yields.

The copolymerization is advantageously effected in the presence of an inert diluent to facilitate handling of the copolymer and to give better temperature control. Normally liquid hydrocarbons are preferred for this purpose, such as benzene, toluene, aliphatic hydrocarbons such as n-hexane, n-heptane, cyclohexane, etc. or propane, butane, propylene, ethylene, ethane, etc. with the use of higher pressures. However, while the copolymerization may be conducted in any of the above diluents, the catalyst system is advantageously prepared in a diluent containing at least 20% aromatic hydrocarbon, such as benzene, toluene, xylene, ethyl benzene, etc. The aromatic hydrocarbons appear to stabilize the catalyst complex. Nevertheless, once the catalyst complex is prepared and stabilized, the copolymerization may be conducted in aromatic, aliphatic or cycloaliphatic hydrocarbon diluents or mixtures thereof.

The copolymerization is advantageously conducted in a pressure vessel to avoid loss of monomer and solvent, particularly if temperatures are to be used at or above the boiling point of either.

Conjugated dienes that may be copolymerized in accordance with this invention include: 1,3-butadiene, isoprene, chloroprene, 2-phenyl-1,3-butadiene, piperylene, etc.

The alpha-olefins that may be copolymerized with the conjugated diene include ethylene, propylene, n-butene-1, isobutylene, n-pentene-1, and other alpha-olefins having up to 10 carbon atoms.

In the comonomer mixture, the propylene or other olefin is used in an amount representing 5–90%, preferably 10–60%, by weight of the total monomers. In the resultant copolymer, the proportion of olefine depends somewhat on the degree of conversion but in most cases is in the range of 5–90 percent, preferably 10–60 percent olefin.

The rubbery copolymers of 1,3-butadiene and olefin produced by the present invention have processing properties and practical physical properties superior to those of rubber products obtained from natural rubber. They can be used for articles such as tire carcasses, tire treads, belting, industrial articles, sponge products and car accessories.

For the production of rubber products the copolymers may be mixed with other rubbery materials such as natural rubber, butadiene-styrene rubber, polybutadiene rubber, polyisoprene rubber, chloroprene rubber, butadiene-acrylonitrile rubber, butadiene-methacrylate rubber and ethylene-propylene rubber in any desired proportion. It is effective for improving the processing properties and practical properties of such rubbery materials. Generally, such a rubber composition should contain at least 20% by weight of the copolymer of the present invention. Below 20%, there is little improvement in the processing properties and the physical properties of the cured rubber products.

The "dilute solution viscosity" referred to herein is defined as the inherent viscosity determined at 25° C on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined from these viscosities and are the number average molecular weights.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A clean, one-gallon stainless steel reactor equipped with stirrer, inlet, outlet and temperature control means is dried and swept clean of air and moisture with a stream of nitrogen. To this reactor there is introduced under an atmosphere of nitrogen, a monomer blend which has been dried by passing it through a 3A molecular sieve column over an hour period. The monomer blend contains 4.12 lbs. of toluene and 0.88 lbs. of an isoprene-propylene mixture containing 0.72 lbs., (326 gms.) of isoprene and 0.16 lbs. (72 gms.) of propylene. This represents 26.9 mole % propylene and 73.1 mole % isoprene in the monomer portion. The catalyst components are then added in the following order: 2.4 millimoles of $CS_2$; 31.78 mM of $TiCl_4$ and 36.54 mM of diethyl aluminum chloride. The Al/Ti ratio is 1.15 and the $Ti/CS_2$ ratio is 13.3/1. This represents about 8 millimoles of catalyst per 100 gms. of monomer. With the temperature maintained at 30°–35° F, the mixture is stirred for 60 hours. Then the catalyst is deactivated and the copolymer precipitated by dropping the reaction product into a large volume of methanol containing one percent antioxidant. The polymer product is drum dried to give 90% yield which indicates a substantial proportion of the propylene is copolymerized.

EXAMPLE II

The procedure of Example I is repeated except that the temperature of polymerization is 25°–35° F, and the polymerization is conducted over a period of 45 hours with samples removed periodically for analysis. The autogenous pressure is 55 psi throughout the reaction. The conversion increases gradually until a conversion of 85% is reached at 25 hours at which point the mole percent of propylene is 16.5% with a DSV of 2.85 and a block polymer content of 24.5%.

EXAMPLE III

The procedure of Example II is repeated at a temperature of 40°–60° C using a monomer blend containing 20% of a mixture of 70% propylene and 30% iosprene (79 mole % propylene and 21 mole % isoprene). The conversion likewise increases gradually until a conversion of 55% is reached at 28 hours with a copolymer mole percent of 62.5%, a DSV of 1.05 and a block polymer content of 26.5%.

EXAMPLE IV

The procedure of Example III is repeated with similar results using in place of the diethyl aluminum chloride equivalent amounts respectively of:

a. $EtAlCl_2$
b. Isobutyl $AlCl_2$
c. Isopropyl $AlBr_2$
d. Diisobutyl AlCl
e. Pentyl $AlH_2$
f. Diisobutyl AlH
g. Phenyl $AlBr_2$
h. Dicyclopentyl AlCl
i. Benzyl $AlCl_2$
j. Diphenyl AlH

EXAMPLE V

The procedures of Examples I and III are repeated a number of times with similar results using in place of the propylene and isoprene equivalent amounts respectively of:

a. Isobutylene and piperylene
b. Propylene and butadiene
c. Isobutylene and isoprene
d. m-Butene-1 and butadiene
e. m-Hexene-1 and isoprene

EXAMPLE VI

The procedures of Examples I and III are repeated with similar results using in place of the TiCl$_4$ equivalent amounts respectively of:

a. VCl$_5$
b. TiBrCl$_3$
c. VBr$_2$Cl$_3$
d. TiBr$_4$
e. VBr$_5$

While certain features of this invention have been described in detail with respect to various embodiments thereof, it will of course, be apparent that other modifications can be made within the spirit and scope of this invention, and it is not intended to limit the invention to the exact details shown above except insofar as they are defined in the following claims:

The invention claimed is:

1. A process for the hydrocarbon solution polymerization of a monomer composition consisting essentially of 10–95 percent by weight of a conjugated diene and 5–90 percent by weight of an alpha olefin having 2–8 carbon atoms to produce a copolymer having 5–90 percent of the alpha olefine in the resultant copolymer comprising the steps of maintaining said monomer composition at a temperature of −10° to 70° C. in intimate contact with a catalyst composition consisting essentially of:
   a. A metal halide compound having the formula TiBr$_n$Cl$_{4-n}$ or VBr$_m$Cl$_{5-m}$ wherein $n$ has a value of 0–4 and $m$ has a value of 0–5;
   b. An aluminum hydrocarbon compound having the formula R$_2$AlX or RAlX$_2$ wherein X is Cl, Br or H, and R is a hydrocarbon group having 1–8 carbon atoms selected from alkyl, aryl and cycloalkyl groups, and
   c. CS$_2$;

the proportion of said metal halide compound being 1–10 millimoles per 100 grams of said monomer composition; the proportion of said aluminum compound being 0.9–3 moles per mole of metal halide compound; and the proportion of said CS$_2$ being 0.01–0.5 mole per mole of said metal halide compound, said polymerization being conducted for a period of at least 1 hour.

2. The process of claim 1 in which said diene is butadiene.

3. The process of claim 1 in which said diene is isoprene.

4. The process of claim 2 in which said alpha-olefin is propylene.

5. The process of claim 1 in which said alpha-olefin is isobutylene.

6. The process of claim 1 in which said metal halide is titanium tetrachloride.

7. The process of claim 6 in which said hydrocarbon group is an alkyl group.

8. The process of claim 6 in which said aluminum compound is a dialkyl aluminum chloride.

9. The process of claim 6 in which said aluminum compound is diisobutyl almuinum chloride.

10. The process of claim 6 in which said aluminum compound is diethyl aluminum chloride.

11. The Process of claim 6 in which said aluminum compound is ethyl aluminum dichloride.

12. The process of claim 7 in which said temperature is 0°–50° C.

13. The process of claim 7 in which said monomer composition is 10–50 percent by weight propylene.

14. The process of claim 13 in which said titanium tetrachloride proportion is about 8 millimoles per 100 grams of monomer.

15. The process of claim 7 in which that Al/Ti molar ratio is in the range of 0.9/1 to 1.15/1.

16. The process of claim 1 in which said hydrocarbon solution contains 10–90 percent by weight of said monomers.

17. The process of claim 1 in which said hydrocarbon solution contains 10–50 percent by weight of said monomers.

18. The process of claim 1 in which said hydrocarbon is an aromatic hydrocarbon.

19. The process of claim 16 in which said hydrocarbon is toluene.

* * * * *